United States Patent Office 2,966,492
Patented Dec. 27, 1960

2,966,492
SUBSTITUTED PIPERIDINE COMPOUNDS
Karl Pfister III, Westfield, N.J., assignor to Merck & Co., Inc., Rahway, N.J., a corporation of New Jersey
No Drawing. Filed Sept. 19, 1956, Ser. No. 610,726
7 Claims. (Cl. 260—294.3)

This invention relates generally to a new class of synthetic substituted piperidines and to processes of preparing such compounds. More particularly, it is concerned with piperidine derivatives in which the nitrogen atom of a piperidine compound has attached to it a 2-pyridylethyl group. Still more particularly, the invention relates to 1-(2-pyridylethyl) - 4 - phenyl - 4 - carbalkoxypiperidines, which new compounds are potent analgesics, and to a method of making them from 4-phenyl-4-carbalkoxy-piperidines and 4-phenyl-4-carboxypiperidines.

It is known that certain N-substituted-4-phenyl-4-carbalkoxypiperidines have analgesic properties, although the degree of analgesic activity depends to a large extent on the particular radical or group attached to the nitrogen atom of the piperidine ring. I have now discovered that 1-(2 - pyridylethyl) - 4 - phenyl - 4 - carbalkoxypiperidines, and their acid addition salts, are potent analgesics, certain of them having a greater degree of analgesic activity than some of the commercially available synthetic analgesics.

The compounds of my invention may be pictured structurally by the following formulae:

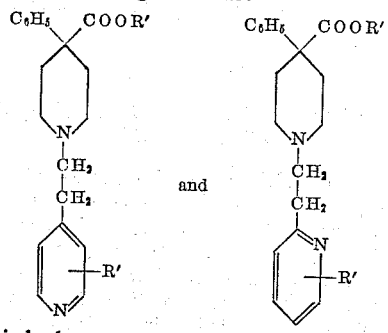

where R' is hydrogen or lower alkyl. Acid addition salts of these substituted piperidines may be prepared containing one or two moles of acid per mole of piperidine derivative. The two R' groups may be the same or different.

The process which I use for making these new compounds comprises the condensation of a vinylpyridine with a 4-phenyl-4-carbalkoxy-(or 4-carboxy)-piperidine and, if desired, treatment of the resulting compound with an acid in order to form an acid addition salt. As applied to the synthesis of 1-[2-(4-pyridyl)ethyl]-4-phenyl-4-carbethoxypiperidine, this process may be pictured structurally as shown below:

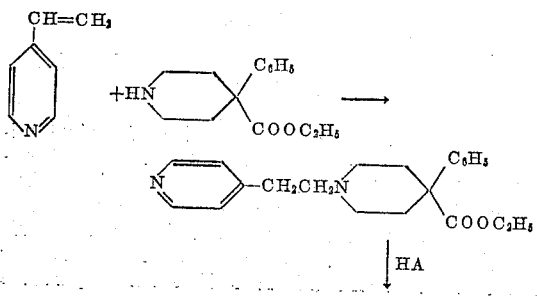

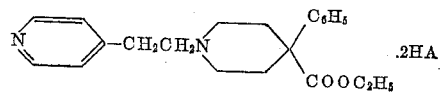

where HA is an acid.

In carrying out this process, I employ as one of the reactants a 2-vinylpyridine or a 4-vinylpyridine. These compounds may have other substituents in the pyridine ring which do not participate directly in or interfere with the condensation reaction. For instance, the vinylpyridine may be nuclearly alkylated with a lower alkyl radical such as a methyl, ethyl, propyl or amyl radical. Examples of pyridine derivatives which may be used in the process are 2-vinylpyridine, 4-vinylpyridine, 5-ethyl-2-vinylpyridine, 2-methyl-6-vinylpyridine and 2,4-dimethyl-6-vinylpyridine and the like.

As the second reactant in the synthesis, there is used a 4-phenylpiperidine having a carboxy or carbo-lower-alkoxy group attached to the 4-position. Thus, 4-phenyl-4-carboxypiperidine, 4-phenyl-4-carbomethoxypiperidine, 4-phenyl-4-carbethoxypiperidine and 4-phenyl-4-carbopropoxypiperidine are examples of suitable piperidine starting materials.

Condensation of the vinylpyridine and the piperidine derivatives may be carried out in the presence of a solvent inert under the reaction conditions or, if desired, in the absence of a solvent. As suitable solvents, there may be mentioned alcohols such as methanol, ethanol, isopropanol and propanol, hydrocarbons such as benzene, toluene and the xylenes and other solvents such as dioxane, tetrahydrofuran and the like. I prefer to have a solvent present since it simplifies the control and handling of the reaction mixture but it is not necessary.

The reaction proceeds well in the absence of any catalyst but, if desired, an acidic catalyst can be added to the reaction mixture separately or introduced by using an acid addition salt of the piperidine reactant. Catalysts such as acetic acid, hydrochloric acid, hydrobromic acid and sulfuric acid are examples of those which may be employed.

In carrying out this process, a wide range of time and temperature conditions may be employed with success, although these two factors are inter-related, the reaction taking place more quickly at high temperature. High yields are obtained when the reaction is conducted at elevated temperatures for a period of about 5 to about 25 hours, and preferably for about 8 to 20 hours. It is preferred to use temperatures ranging from about 40° C. to about 120° C., with temperatures in the range of 50° C. to 80° C. being most satisfactory.

After completion of the condensation reaction the new analgesic substance may be isolated in any of several different ways. I have found it advantageous to neutralize any acid that is present, extract the free base into a water immiscible organic solvent such as ether and obtain an acid addition salt directly from the organic solvent by addition of an appropriate acid. Alternatively, the free base may be isolated by direct crystallization from the organic solvent without acidification.

In using these piperidine derivatives as analgesics it is customary to employ an acid addition salt rather than the free base, and for that reason the crystalline salt is ordinarily isolated without resort to the intermediate isolation of the free base. These salts are readily made by addition of an acidic alkanol to an organic solvent solution of the base, whereby the acid addition salt will, in most cases, crystallize directly in substantially pure form. Alternatively, the acid may be added, under anhydrous conditions, to an organic solvent solution of the base, whereby crystallization occurs and the acid addition salt isolated as by filtration. Preferably, an excess of acid is used in order to obtain the di-acid addition salt. Examples of suitable acid salts are the hydrochloride, hydrobromide, citrate, lactate, oxalate and the like.

Representative of the new analgesic substances provided by my invention are:

1-[2-(2-pyridyl)ethyl]-4-phenyl-4-carbethoxypiperidine
1-[2-(2-pyridyl)ethyl]-4-phenyl-4 - carbethoxypiperidine dihydrochloride
1-[2-(2-pyridyl)ethyl]-4-phenyl-4 - carbomethoxypiperidine hydrochloride
1-[2-(4-pyridyl)ethyl]-4-phenyl - 4 - carbethoxypiperidine
1-[2-(4-pyridyl)ethyl]-4-phenyl - 4 - carbethoxypiperidine dihydrochloride
1-[2 - (4 - pyridyl)ethyl] - 4 - phenyl - 4 - carbomethoxypiperidine hydrobromide
1-[2-(4-pyridyl)ethyl] - 4 - phenyl - 4 - carbethoxypiperidine sulfate
1-[2-(4-pyridyl)ethyl]-4-phenyl-4 - carbethoxypiperidine citrate
1-[2-(6-methyl-2-pyridyl)ethyl] - 4 - phenyl - 4 -carbethoxypiperidine dihydrochloride
1-[2-(4,6-dimethyl-2 - pyridyl)ethyl] - 4 -phenyl - 4 - carbethoxypiperidine dihydrochloride
1-[2-(5-ethyl-2-pyridyl)ethyl] - 4 - phenyl - 4 carbethoxypiperidine dihydrochloride
1-[2-(4-pyridyl)ethyl]-4-phenyl-4-carbopropoxypiperidine The 1-(2-pyridylethyl)-4-phenyl-4-carbo-lower-alkoxy-piperidines are the preferred analgesics and of these the 4-carbethoxypiperidines are most satisfactory. The 1-(2-pyridylethyl)-4-phenyl-4-carboxypiperidines are of value primarily as intermediates in making the esters rather than as an analgesic in their own right. When the condensation process has been carried out with 4-phenyl-4-carboxypiperidine, the 4-carboxy derivative obtained may be converted to a lower alkoxy ester by treatment with a lower alkanol, such as methanol and ethanol in the presence of excess mineral acid. In this way the ester corresponding to the alkanol is obtained.

The 1-(2-pyridylethyl)-4-phenyl-4-carbo-loweralkoxy-piperidines and their acid addition salts provided by my invention may be formulated for use into tablets or solutions. Compressed tablets may be prepared containing essentially any desired amount of analgesic although we prefer to make tablets containing from about 15 to about 60 ml. of analgesic per tablet. Solutions, and these are ordinarily parenteral solutions, can be conveniently made having from about 10 to about 50 mg. of analgesic per ml. of solution. For these formulations, it is preferred to use the analgesics as their acid addition salts.

The following examples are given for purposes of illustration and not of limitation:

EXAMPLE 1

*1-[2-(2-pyridyl)ethyl]-4-phenyl-4-carbethoxypiperidine dihydrochloride*

A solution of 4.57 grams (0.02 mole) of 4-phenyl-4-carbethoxypiperidine and 2.1 grams (0.02 mole) of 2-vinyl-pyridine in 80 ml. of benzene is heated on the steam bath and the benzene boiled off. The residual mixture is heated further on the steam bath for 16 hours. The semi-solid is dissolved in 100 ml. of benzene and the solution washed with 100 ml. of water. The base is then extracted from the benzene solution by shaking with 100 ml. of 10% hydrochloric acid. The extract is made alkaline with 30% sodium hydroxide and shaken with 100 ml. of ether. The mixture is filtered from insoluble material, the ether layer separated and dried over magnesium sulfate. The dihydrochloride of 1-[2-(2-pyridyl)ethyl]-4-phenyl-4-carbethoxypiperidine is precipitated by addition of an excess of a 4 N solution of hydrogen chloride in isopropyl alcohol. After cooling, the suspension is filtered and dried. The salt weighs 3.48 grams, melting point 169–175° C. It is recrystallized by dissolving in 20 ml. of methanol, adding two grams of activated charcoal (Darco G–60), filtering and adding 80 ml. of ether. The resulting crystals of the dihydrochloride are separated and dried, melting point 175–178° C. *Analysis.*—Calcd. for $C_{21}H_{28}N_2O_2Cl_2$, C, 61.31; H, 6.86; N, 6.81; Cl, 17.24. Found: C, 61.43; H, 6.50; N, 7.07; Cl, 16.9.

EXAMPLE 2

*1-[2-(4-pyridyl)ethyl]-4-phenyl-4-carbethoxypiperidine free base and its monohydrobromide*

Five grams of 4-vinylpyridine (0.0476 mole) and 14.93 grams of 4-phenyl-4-carbethoxypiperidine hydrobromide (0.0476 mole) are dissolved in 50 ml. of absolute ethanol and the solution heated at the reflux temperature for 17 hours with agitation. The ethanol is then removed under reduced pressure leaving a crystalline residue. The residue is slurried in petroleum ether, transferred to a funnel, washed with petroleum ether and dried. The product weighs 16.16 grams. On recrystallization from 50 ml. of acetonitrile it has a melting point of 152–160° C., and is largely the monohydrobromide of 1-[2-(4-pyridyl)ethyl]-4-phenyl-4-carbethoxypiperidine.

The free base is prepared by dissolving five grams of the monohydrobromide in 50 ml. of warm water and adding an excess sodium hydroxide solution. The base crystallizes directly. On filtration, washing and drying it weighs 3.12 grams, melting point 59–65° C. Recrystallization from 15 ml. of hexane raises the melting point to 60–66.5° C.

The 4 - phenyl - 4 - carbethoxypiperidine hydrobromide used in this reaction is prepared by passing gaseous hydrogen bromide into a solution of 4-phenyl-4-carbethoxypiperidine in ether. The crystals thus obtained, after separation, washing with acetone and drying, melt at 167–179° C.

EXAMPLE 3

*1-[2-(4-pyridyl)ethyl]-4-phenyl-4-carbethoxypiperidine dihydrobromide*

A mixture of 23.3 grams (0.1 mole) of 4-phenyl-4-carbethoxypiperidine, 10.5 grams (0.1 mole) of 4-vinyl-pyridine, six grams (0.1 mole) of glacial acetic acid and 40 ml. of methanol is refluxed overnight. The mixture is allowed to cool and poured into a mixture of 100 ml. of 10% sodium hydroxide solution, 100 grams of ice, and 200 ml. of ether. This mixture is shaken, the ether layer separated, and the aqueous phase washed with two 50 ml. portions of ether. All the ether phases are then combined, washed with three 100 ml. portions of cold water and dried over sodium sulfate. After separation of the drying agent, 120 ml. of 2.5 N hydrogen bromide in absolute ethanol is added to the ether solution, giving crystallization of the dihydrobromide of 1-[2-(4-pyridyl)-ethyl]-4-phenyl-4-carbethoxypiperidine. The suspension is chilled for an hour and filtered. The crystals are dried to constant weight, 39.9 grams, melting point 238–240.5° C. after a transition at 213–215° C.

EXAMPLE 4

*1-[2-(4-pyridyl)ethyl]-4-carbethoxy-4-phenylpiperidine dihydrochloride*

A mixture of 10.5 grams (0.1 mole) of 4-vinylpyridine and 23.3 grams (0.1 mole) of 4-phenyl-4-carbethoxypiperidine is heated on the steam bath overnight. The resulting mixture is allowed to cool and the gummy reaction product dissolved in 300 ml. of 6 N hydrochloric acid. The acid solution is poured with efficient stirring into a mixture of 250 ml. of 30% sodium hydroxide solution, 250 grams of ice, and 300 ml. of ether. The gummy product which separates is removed by coagulation with diatomaceous earth (Super-Cel) followed by filtration of the entire mixture through a 1 cm. Super-Cel mat. The ether layer is separated and washed with three 100 ml. portions of water, then dried over magnesium sulfate. To the ether solution remaining after filtering off the drying agent is added 20 ml. of 5.7 N hydrogen chloride in absolute ethanol. The crude dihydrochloride first oils out, then crystallizes. The product is collected on a filter, washed with ether, then dried in vacuum. There are obtained 6.88 grams of 1-[2-(4-pyridyl)ethyl]-4-carbethoxy - 4 - phenylpiperidine dihydrochloride, melting point 225–230° C. Six grams of this crude product is dissolved in 30 ml. of methanol and 100 ml. of ether added slowly. Upon cooling, colorless blades separate which after filtration, washing with 30 ml. of ether and drying, melt at 225–228° C. (d.) after a transition at 205–206° C. *Analysis*—Calcd. for $C_{21}H_{26}N_2O_2 \cdot 2HCl$: C, 61.31; H, 6.86; N, 6.81; Cl, 17.24. Found: C, 61.31; H, 6.81; N, 6.77; Cl, 18.6, 18.7.

EXAMPLE 5

*1 - [2-(6-methyl-2-pyridyl)ethyl]-4-carbethoxy-4-phenyl-piperidine dihydrochloride*

A solution of 11.9 grams (0.1 mole) of 2-methyl-6-vinylpyridine and 31.4 grams (0.1 mole) of 4-carbethoxy-4-phenylpiperidine hydrobromide in 120 ml. of absolute ethanol is agitated and heated at the reflux temperature for seventeen hours. The ethanol is then removed under reduced pressure. The residue is cooled and to it are added 200 ml. of ether, 100 grams of ice, and 100 ml. of 10% sodium hydroxide. The mixture is shaken and the ether layer separated. The aqueous layer is washed with two 50 ml. portions of ether. All ether phases are combined and dried over anhydrous sodium sulfate. Excess hydrogen chloride gas is bubbled into the ether solution and the resulting crystals are collected, washed with ether, and dried, being substantially pure 1-[2-(6-methyl-2-pyridyl)ethyl] - 4-carbethoxy-4-phenylpiperidine dihydrochloride. (Synonym: Ethyl 1-[2-(6-methyl-2-pyridyl)ethyl] - 4 - phenylisonipecotate dihydrochloride.)

EXAMPLE 6

*1-[2-(4,6-dimethyl - 2 - pyridyl)ethyl] - 4 - carbethoxy-4-phenylpiperidine dihydrochloride*

Starting with 13.3 grams (0.1 mole) of 2,4-dimethyl-6-vinylpyridine and proceeding as in Example 5, one obtains 1-[2-(4,6 - dimethyl - 2 - pyridyl)ethyl] - 4-carbethoxy-4-phenylpiperidine dihydrochloride.

EXAMPLE 7

*1-[2-(5-ethyl-2-pyridyl)ethyl]-4-carbethoxy-4-phenyl-piperidine dihydrochloride*

Starting with 13.3 grams (0.1 mole) of 5-ethyl-2-vinyl-pyridine and proceeding as in Example 5, one obtains 1-[2-(5-ethyl-2-pyridyl)ethyl] - 4 - carbethoxy-4-phenyl-piperidine dihydrochloride.

EXAMPLE 8

*1-[2-(4-pyridyl)ethyl] - 4 - phenyl - 4 - carboxypiperidine*

To a solution of grams of 4-carbethoxy-4-phenylpiperidine carbonate in 40 ml. of ethanol is added a solution of 5 grams of potassium hydroxide in 10 ml. of water. The resulting solution is heated at the reflux temperature for two hours and then diluted with 150 ml. of water. Acetic acid is added slowly until the pH is about 6, at which point the 4-carboxy-4-phenylpiperidine crystallizes. The crystals are washed with water and dried.

2.3 grams of 4-phenyl-4-carboxypiperidine, 1.1 grams of 4-vinylpyridine and 0.6 gram of glacial acetic acid are added to 4 ml. of methanol and the resulting mixture heated at the reflux temperature for 15 hours. The mixture is then cooled and added to 10 ml. of 10% sodium hydroxide solution, 10 grams of crushed ice and 15 ml. of ether. The mixture is neutralized with dilute hydrochloric acid. After shaking, the ether layer is separated and the aqueous layer washed with two 5 ml. portions of fresh ether. All of the ether solutions are combined, washed with cool water and dried over sodium sulfate. The ether is then removed by evaporation. The solid residue is substantially pure 1-[2-(4-pyridyl)ethyl]-4-phenyl-4-carboxypiperidine.

EXAMPLE 9

*1-[2-(4-pyridyl)ethyl]-4-carbethoxy-4-phenylpiperidine dihydrochloride*

To the residue obtained in Example 8 is added 50 ml. of ethanol and 10 ml. of concentrated sulfuric acid the resulting mixture is refluxed for five hours and then poured on to 100 grams of chopped ice. The resulting mixture is brought to pH of at least 10 with sodium hydroxide solution. The quenched mixture is extracted with two 100 ml. portions of ether, the ether layer separated, washed with water and dried over magnesium sulfate. After separation of the drying agent ethanol which is 2.5 N in hydrogen chloride is added to the ether solution until crystallization of the dihydrochloride of 1-[2-(4-pyridyl)ethyl]-4-phenyl-4-carbethoxypiperidine is complete. The suspension is cooled and the product filtered, washed with ether and dried.

EXAMPLE 10

(A) *Parenteral solutions*

|  | Per Ml. |
|---|---|
| 1-[2-(4-pyridyl)ethyl]-4-carbethoxy-4-phenylpiperidine dihydrochloride | 50 mg. |
| Benzyl alcohol reagent | 9 mg. |
| Sodium bisulfite reagent | 2 mg. |
| Sodium phosphate (monobasic) | 7.5 mg. |
| Thiovanol | 10 mg. |
| Pyrogen-free distilled water, to make | 1.00 cc. |

The components are mixed under a nitrogen atmosphere and the solution sterilized by filtration through a sterile filter with nitrogen pressure. The resulting sterile solution is subdivided into vials. It has a pH of about 3.

(B) *Tablets*

|  | Tablets | |
|---|---|---|
|  | 30 Mg. | 60 Mg. |
| 1-[2-(4-pyridyl)ethyl]-4-carbethoxy-4-phenylpiperidine dihydrochloride gm | 0.030 | 0.060 |
| Lactose U.S.P. gm | 0.062 | 0.124 |
| Starch U.S.P. gm | 0.010 | 0.020 |
| Starch (10% paste) gm | 0.002 | 0.004 |
| Starch U.S.P. gm | 0.005 | 0.010 |
| Magensium stearate gm | 0.001 | 0.002 |
| Tablet Weight gm | 0.110 | 0.002 |

The analgesic, lactose and starch are blended, and granulated with the starch paste. The wet mass is forced through a No. 8 screen and dried at 40° C. The dry granules are then forced through a No. 14 screen, the starch and magnesium stearate added and the mixture blended. The product is then compressed into tablets.

Any departure from the above description which conforms to the present invention is intended to be included within the scope of the claims.

What is claimed is:

1. A compound selected from the group consisting of 1-(2-(6 methyl-2-pyridyl) ethyl)-4-carbethoxy-4-phenyl-piperidine, 1-(2-(4,6 dimethyl-2-pyridyl) ethyl)-4-carbethoxy-4-phenylpiperidine, 1-(2-(5-ethyl-2-pyridyl) ethyl)-4-carbethoxy-4-phenylpiperidine, and non-toxic acid addition salts thereof.

2. 1-(2-(6 methyl-2-pyridyl) ethyl)-4-carbethoxy-4-phenylpiperidine.

3. 1-(2-(6 methyl-2 pyridyl) ethyl)-4-carbethoxy-4-phenylpiperidine dihydrochloride.

4. 1-(2-(4,6 dimethyl-2-pyridyl) ethyl)-4-carbethoxy-4-phenylpiperidine.

5. 1-(2-(4,6 dimethyl-2-pyridyl) ethyl)-4-carbethoxy-4-phenylpiperidine dihydrochloride.

6. 1-(2-(5 ethyl-2-pyridyl) ethyl)-4-carbethoxy-4-phenylpiperidine.

7. 1-(2-(5 ethyl-2-pyridyl) ethyl)-4-carbethoxy-4-phenylpiperidine dihydrochloride.

No references cited.